(12) United States Patent
Rizea et al.

(10) Patent No.: US 11,950,567 B2
(45) Date of Patent: Apr. 9, 2024

(54) CONDOR MONITORING SYSTEMS AND RELATED METHODS

(71) Applicant: Sky View Environment Service LLC, San Francisco, CA (US)

(72) Inventors: Steven Rizea, Orlando, FL (US); Emanoel Rizea, Coral Springs, FL (US)

(73) Assignee: SKY VIEW ENVIRONMENTAL SERVICE LLC, San Francisco, CA (US)

(*) Notice: Subject to any disclaimer, the term of this patent is extended or adjusted under 35 U.S.C. 154(b) by 116 days.

(21) Appl. No.: 17/687,245

(22) Filed: Mar. 4, 2022

(65) Prior Publication Data

US 2022/0279755 A1 Sep. 8, 2022

Related U.S. Application Data

(60) Provisional application No. 63/156,682, filed on Mar. 4, 2021.

(51) Int. Cl.
| | |
|---|---|
| *G08B 21/00* | (2006.01) |
| *A01K 11/00* | (2006.01) |
| *G01S 19/46* | (2010.01) |
| *H04B 1/034* | (2006.01) |
| *H04W 4/029* | (2018.01) |

(52) U.S. Cl.
CPC ............ *A01K 11/008* (2013.01); *G01S 19/46* (2013.01); *H04B 1/0343* (2013.01); *H04W 4/029* (2018.02)

(58) Field of Classification Search
CPC ....... A01K 11/008; G01S 19/46; G01S 19/14; G01S 19/393; G01S 5/0294; G01S 2205/01; G01S 11/06; H04B 1/0343; H04W 4/029
USPC .................................................... 340/539.13
See application file for complete search history.

(56) References Cited

U.S. PATENT DOCUMENTS

| | | |
|---|---|---|
| 6,965,827 B1 | 11/2005 | Wolfson |
| 7,577,444 B2 | 8/2009 | Bird et al. |
| 7,705,728 B2 | 4/2010 | Mock et al. |
| 7,864,103 B2 | 1/2011 | Weber et al. |
| 7,872,583 B1 | 1/2011 | Yushkov et al. |
| 7,965,188 B2 | 6/2011 | Geissler |
| 8,279,109 B1 | 10/2012 | Piesinger |
| 8,502,730 B2 | 8/2013 | Roche |
| 8,588,464 B2 | 11/2013 | Albertson et al. |

(Continued)

*Primary Examiner* — Mark S Rushing
(74) *Attorney, Agent, or Firm* — Norton Rose Fulbright US LLP

(57) ABSTRACT

The present disclosure includes devices, and systems for monitoring and detection systems. Some of the methods may include monitoring one or more birds that each has a receiver-located tag and/or a global positioning satellite (GPS) tag, and for each of the bird(s) having a receiver-located tag: receiving, at at least one of a plurality of detection stations, a signal from the receiver-located tag, each of the detection stations comprising two or more directional antennas, determining bird heading information and bird distance information, estimating a position and trajectory of the bird; and calculating an amount of time for the bird to reach a boundary around a wind turbine (TTB). In some methods, for each of the bird(s) having a GPS tag: receiving GPS data from the GPS tag when the bird crosses a geo-fence that surrounds the wind turbine; estimating a position and trajectory of the bird.

14 Claims, 9 Drawing Sheets

(56) References Cited

U.S. PATENT DOCUMENTS

| | | |
|---|---|---|
| 8,598,998 B2 | 12/2013 | Vassilev et al. |
| 8,742,977 B1 | 6/2014 | Piesinger |
| 8,836,344 B2 | 9/2014 | Habib et al. |
| 9,086,693 B2 | 7/2015 | Calliari |
| 9,107,395 B2 | 8/2015 | Lee et al. |
| 9,390,302 B2 | 7/2016 | Bassan-Eskenazi et al. |
| 9,424,468 B2 | 8/2016 | Shimizu et al. |
| 9,436,858 B2 | 9/2016 | Liao |
| 9,437,111 B2 | 9/2016 | Ignaczak et al. |
| 9,489,813 B1 | 11/2016 | Beigel |
| 9,538,329 B1 | 1/2017 | Vivathana |
| 9,581,165 B2 | 2/2017 | Babbitt et al. |
| 9,654,925 B1 | 5/2017 | Solinsky et al. |
| 9,743,643 B1 | 8/2017 | Kaplan et al. |
| 9,775,337 B2 | 10/2017 | Duncan et al. |
| 9,848,295 B1 | 12/2017 | Mason et al. |
| 9,886,864 B1 | 2/2018 | Chubb et al. |
| 10,026,291 B2 | 7/2018 | Zhang et al. |
| 10,094,908 B2 | 10/2018 | Taylor, Jr. et al. |
| 10,099,609 B2 | 10/2018 | Pagliani et al. |
| 10,102,750 B2 | 10/2018 | Aso et al. |
| 9,856,860 B2 | 12/2018 | Vangen et al. |
| 10,277,305 B1 | 4/2019 | Shafer et al. |
| 10,302,736 B2 | 5/2019 | Sutter et al. |
| 10,316,823 B2 | 6/2019 | Bacquie et al. |
| 10,349,630 B2 | 7/2019 | Florczak |
| 10,398,130 B2 | 9/2019 | Birch et al. |
| 10,417,888 B2 | 9/2019 | Emmanuel et al. |
| 10,417,892 B2 | 9/2019 | Das et al. |
| 10,453,327 B2 | 10/2019 | Messier et al. |
| 10,455,810 B1 | 10/2019 | Landers et al. |
| 10,492,470 B1 | 12/2019 | Silverman et al. |
| 10,514,439 B2 | 12/2019 | Seltzer |
| 10,519,932 B2 | 12/2019 | Wenger et al. |
| 10,591,592 B2 | 3/2020 | Mindell et al. |
| 10,638,726 B1 | 5/2020 | Makarychev et al. |
| 10,643,453 B2 | 5/2020 | Doxey et al. |
| 10,534,070 B2 | 12/2020 | Hammings et al. |
| 2009/0009388 A1* | 1/2009 | Wangrud ............. A01K 29/005 342/357.55 |
| 2010/0236497 A1 | 9/2010 | Philiben et al. |
| 2011/0260907 A1* | 10/2011 | Roche ...................... G01S 13/88 342/27 |
| 2013/0050400 A1 | 2/2013 | Stiesdal et al. |
| 2013/0098309 A1* | 4/2013 | Nohara ................. A01M 29/18 119/713 |
| 2013/0257641 A1 | 10/2013 | Ronning |
| 2013/0280033 A1* | 10/2013 | Babbitt ............... F04D 15/0066 415/16 |
| 2014/0265330 A1 | 9/2014 | Carkner |
| 2015/0130618 A1 | 5/2015 | Hamming et al. |
| 2015/0145728 A1 | 5/2015 | Addison |
| 2015/0010399 A1 | 10/2015 | Bahat et al. |
| 2016/0055399 A1 | 2/2016 | Hiester |
| 2016/0139240 A1* | 5/2016 | Sutter ...................... G01S 5/021 342/450 |
| 2017/0000106 A1 | 1/2017 | Duncan et al. |
| 2017/0023659 A1 | 1/2017 | Bruemmer et al. |
| 2017/0301206 A1 | 10/2017 | Braxton |
| 2018/0171972 A1* | 6/2018 | Merz .................... G05B 13/026 |
| 2018/0370034 A1 | 12/2018 | Lee et al. |
| 2019/0049549 A1 | 2/2019 | Tang et al. |
| 2019/0110441 A1 | 4/2019 | Mobley |
| 2019/0141953 A1 | 5/2019 | Landers et al. |
| 2019/0150404 A1 | 5/2019 | Seltzer et al. |
| 2019/0225214 A1 | 7/2019 | Pohl et al. |
| 2019/0281794 A1 | 9/2019 | Ehrman et al. |
| 2019/0289821 A1 | 9/2019 | Martinez-Barreiro et al. |
| 2019/0325254 A1 | 10/2019 | Jorquera et al. |
| 2019/0361109 A1 | 11/2019 | Mindell et al. |
| 2019/0021303 A1 | 12/2019 | Swaddle |
| 2019/0377322 A1 | 12/2019 | Hornung et al. |
| 2020/0059860 A1 | 2/2020 | Huang |
| 2020/0111365 A1 | 4/2020 | Frederick et al. |
| 2020/0150226 A1 | 5/2020 | Hamminga et al. |
| 2020/0163311 A1 | 5/2020 | Kelly et al. |
| 2020/0167938 A1 | 5/2020 | Matzner |

* cited by examiner

GSM/GPS Tracking Data for the Southern California Subpopulation of California Condors Collected in 2017 and 2019 Overlain with Illustrations of Primary Flight Corridors and Roosting Locations in the Vicinity of the Alta Wind Facilities Potential Receiver Tower Locations Evaluated in this Assessment

CONDOR MONITORING SYSTEMS AND RELATED METHODS

CROSS-REFERENCE TO RELATED APPLICATIONS

This application claims priority to U.S. Provisional Patent Application 63/156,682 filed Mar. 4, 2021, the entirety of which is incorporated by reference herein.

FIELD OF INVENTION

The present invention relates generally to a detection system.

BACKGROUND

The monitoring of wildlife is utilized for varies purposes. For example, the environmental permits issued for the Alta I, II, III, IV, V, X, and XI wind farms require monitoring of California condor activity over a specified coverage area. The monitoring is intended to curtail turbines in time to avoid the risk of a condor striking a moving turbine blade. The preliminary design of such a system has been completed, including hardware requirements, system operation concepts, a cost estimate, and a development schedule.

Current monitoring systems are described in: Alta Windpower Development. (2014). *Bird and Bat Conservation Strategy Alta East Wind Project*; Ventura Fish and Wildlife Office. (2013). *Biological Opinion for the Alta East Wind Project, Kern County, California* ((3031 (P), CACA-052537, CAD000.06)) (8-8-13-F-19); and Roland Kays et al. (2011). *Tracking Animal Location and Activity with an Automated Radio Telemetry System in a Tropical Rainforest*, The Computer Journal (Oxford University Press). However, improvements are needed in current monitoring and detection systems.

SUMMARY

The present disclosure includes a condor monitoring system that will provide data on the presence and location of condors in the Southern California flock that have GPS or VHF tracking tags.

Active transmitter tags are used to track the location of moving objects in real time. The tags are affixed to the object(s) of interest and send out a signal that interacts with receiving systems in a manner that allows estimation of the tag's location and/or trajectory. Two types of tags are considered in the invention: receiver-located tags and self-located tags.

Receiver-located tags emit a signal that is detected by a receiver station. The receiver station uses signal characteristics to estimate the presence, location, and/or trajectory of the tag. An example of receiver-located tags includes, but is not limited to, VHF transmitter tags attached to animals to track their location. The use of receiver-located tags can, but need not, involve the use of received signal strength. Signal strength is correlated with the distance between the tag and the receiver; weak signals indicate a large distance and strong signals indicate a short distance. Several embodiments of the invention relate to improving how signal strength can be used to estimate the distance between a receiver-located tag and a receiver.

Self-located tags determine their location themselves, and then transmit that location to a receiver station. An example of self-located tags includes, but is not limited to, GPS tags attached to animals to track their location. Self-located tags can, but need not, transmit their locations via cellular modem. GPS tags are an example of self-located tags, and Very High Frequency (VHF) tags are an example of receiver-located tags. Throughout this document, the term "VHF tag" refers to any type of receiver-located tag, and the term "GPS tag" refers to any type of self-located tag.

The usefulness of active transmitter tags is dependent on the precision and accuracy of position and/or trajectory estimates calculated by receiving system. The claims presented in this document are methods to improve the precision and/or accuracy of transmitter tag location and/or trajectory estimates.

Condor presence and location data will be presented to members of a condor initial response team (CIRT). The CIRT is responsible for locating any detected condors (visually or via handheld VHF receivers) if possible. They are also responsible for issuing curtailment commands to turbines as needed to avoid an impact between turbine blades and condors. The criteria upon which the preliminary design is based (including details on curtailment requirements) are compiled in the following document: Basis of Design for a Condor Monitoring System Rev 4 dated September $2^{nd}$, 2020.

The condor monitoring system includes three subsystems: (1) The VHF system; (2) The GPS system; and (3) The unified alerting and monitoring system (UAMS). The VHF system detects condors that carry VHF tags. The GPS system detects condors that carry GPS tags. The UAMS compiles the position data from the other two systems and initiates response protocols.

This document serves to describe the system design and operation based on an initial review of the system requirements, hardware that is commercially available, and conceptual system operation algorithms.

The invention includes methods to improve estimates of the position and/or trajectory of active transmitter tags: including estimation of signal degradation based on Fresnel zone analysis of site topography to inform estimation of the distance between a receiver system and a receiver-located tag; supplementation of signal degradation calculations with the results of system mapping; use of fixed sentinel signals to monitor the magnitude of signal degradation due to variable environmental factors, one example of which is weather; refinement of position estimates by accounting for the absence of signal detection (location by exclusion). For tags attached to moving entities, calculation of a time-to-boundary (TTB) parameter. The TTB is an estimate of the minimum amount of time required for the animal to reach a point of interest. Integration of position estimates from one type of tag based on estimates from the other type of tag, when both are attached to the same entity, to improve the precision and/or accuracy of position and/or trajectory estimates calculated from the less precise and/or accurate tag.

The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the terms "substantially" and "about" may be substituted with "within [a percentage] of" what is specified, where the percentage includes 0.1, 1, 5, and 10 percent.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the configuration depicted in the figures.

DETAILED DESCRIPTION

The monitoring system consolidates data from two condor tracking systems. The first, the VHF system, uses radio-wave tracking tags. These tags emit pulses of radio transmissions at specified frequencies. The VHF system includes six or seven detection stations that scan for these frequencies. Whenever a tag is detected within the coverage area, the system calculates an estimated position. Results from multiple detection stations are used to triangulate a more accurate estimate.

The second tracking system, the GPS system, uses cellular-enabled GPS tracking tags. These tags record their position using GPS and then transmit their position history to a central server via a cellular data connection built into the tags. As an additional feature, the tags are programmable with geo-fences. A geo-fence is a list of coordinates that defines a boundary (e.g. —a circle around a wind farm). The GPS tag immediately reports its position whenever it crosses a geo-fence. The GPS system uses custom-designed geo-fences to create a nested set of boundaries that will trigger a series of position updates to the tag manufacturer's central server. The GPS system receives alerts from the central server that provide the position of the condor in real time.

The position data from the VHF and GPS systems is compiled by the unified alerting and monitoring system (UAMS). The UAMS calculates the position, trajectory, positional uncertainty, and trajectory uncertainty of each condor within the coverage area. It then computes the minimum amount of time it would take each condor to get within 3.2 km (2 miles) of a wind turbine—the time to boundary (TTB). The TTB value is used to trigger response protocols that will provide more accurate location data (e.g. —staff observing condors directly) and recommend turbine curtailment if necessary.

Figure 1:
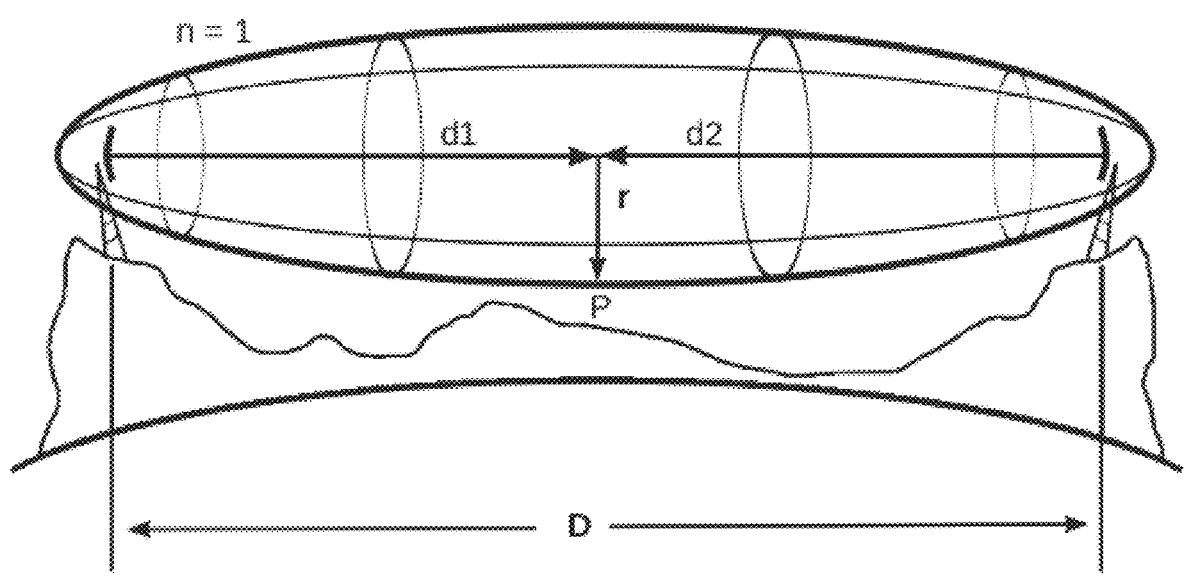
FIG. 1 is a Schematic of a Fresnel Zone

Degradation of radio-frequency transmissions can be estimated based on analysis of Fresnel zones. Fresnel zones are prolate spheroids with a size dependent on the broadcast frequency and the distance between the transmitter and receiver. FIG. 1 shows a schematic of a Fresnel zone.

An embodiment of the invention is to calculate Fresnel zones between a receiver-located tag and one or more receiver stations. Available topographic data can be used to determine what percentage of the Fresnel zones are obstructed to develop an estimate of the expected signal degradation due to obstructions between the tag and receiver(s). This estimate of signal degradation can be used in the calculation of an estimated distance between the tag and receiver. An example of the use of signal degradation in distance calculation includes, but is not limited to, a high obstruction percentage reducing the estimated distance calculated by free-space radio wave propagation theory.

Supplementation of Signal Degradation Estimates Via Mapping

The use of Fresnel zones is a way to estimate radio frequency signal degradation, and it can be subject to inaccuracies. Other methods of radio frequency signal degradation are similarly subject to inaccuracies. An embodiment of the invention is to use mapping to improve the accuracy signal degradation estimates obtained by Fresnel zone analysis as described herein or by other methods. An example of a mapping method includes, but is not limited to:

1. Place one or more receiver stations in an area of interest.
2. Via helicopter, drone, or other method, move a receiver-located transmitter tag through the area while monitoring tag location via GPS, differential GPS, or another geo-location method. The tag can be, but need not be, moved through all three dimensions.
3. Measure and record the signal strength at the receiver station(s) as the tag is moved through the area.
4. Compare the signal strength measured by the receiver stations with the estimates derived from the Fresnel zone method described herein. Methods of comparison can include, but are not limited to, minimization of mean square error.
5. Create correction factors to be applied to the signal degradation estimate. Example correction factors include, but are not limited to, linear scale factors and non-linear correction equations.

Use of Sentinel Signals to Refine Distance Estimates

The use of Fresnel zones to estimate degradation of radio frequency transmissions only accounts for obstruction by fixed objects between the transmitter and receiver. Other parameters that affect signal degradation include, but are not limited to, air humidity levels, precipitation, and airborne dust. An embodiment of the invention is to use sentinel signals to monitor signal degradation caused by factors other than obstruction.

An example of the use of sentinel signals includes, but is not limited to: Install receiver-located tags at known locations in the area of interest. The absolute locations of these tags are determined via GPS, differential GPS, or other methods and then recorded. The tags can, but need not, be installed such that each receiver in the area of interest can detect at least one tag. Monitor the sentinel tag signal strength measured by the receivers in the area of interest. Characterize the level of signal degradation due to factors other than fixed-object obstruction by comparing the signal strength at any given moment to baseline conditions. Methods for comparison can include, but are not limited to, difference from baseline, variance from baseline, and exceedance probability. Example baseline conditions include, but are not limited to, average values, values measured during a mapping exercise, and theoretical values based on the Fresnel zone method described herein. The baseline values could, but need not, be established by the mapping method described herein. Use the characterization of signal degradation to adjust estimates of the distance between a non-sentinel receiver-located tag and a receiver. An example of this adjustment includes, but is not limited to, calculating an effective signal strength by applying a linear correction factor (e.g.—a 10% difference in sentinel signal strength compared to baseline results in a 10% adjustment to the signal strength received from a non-sentinel tag).

Location by Exclusion

An application of the invention uses multiple receivers to allow for improved estimation of receiver-located tag location and/or trajectory. This application can, but need not, produce a locus of possible tag locations. The locus can, but need not, be derived from an estimated location and an estimate of positional uncertainty. An embodiment of the invention makes use of one or more receivers that do not detect a tag that is detected by one or more other receivers.

An example of the method for making use of receivers that do not detect the tag includes, but is not limited to: Determine estimated coverage areas for each receiver in the area of interest. The coverage area estimation can, but need not, make use of the Fresnel zone method, the mapping method, the use of sentinel signals as described herein, and/or other methods. Some methods can include to estimate the location of the tag based on those receivers that detect it. If the locus of possible locations that result from the estimation process includes areas covered by receivers that did not detect the tag, exclude those areas from the locus.

Calculation of a Time-to-Boundary Parameter

An application of the invention is to monitor the distance between an active transmitter tag and some point of interest so that some action can be taken. An example includes, but is not limited to, the approach of an endangered species to a man-made structure that could harm the animal. In this example, the action taken could include, but is not limited to, deactivation of a system associated with the structure to mitigate the threat of harming the endangered species.

An embodiment of the invention is the calculation of a time-to-boundary (TTB) parameter. The TTB parameter is an estimate of the minimum amount of time necessary for an active transmitter tag to reach a point of interest. An example of the TTB calculation includes, but is not limited to characterize the potential speed and trajectory of the tag. An example of this process includes, but is not limited to, characterizing the likely speeds and trajectories taken by an endangered species to which the tag is attached. Additional examples include to use an estimated position of the tag and the speed/trajectory characterization to estimate the minimum amount of time required for the tag to reach the point of interest, which is the TTB. The TTB can, but need not, be modified by a speed or trajectory derived from a time-history of tag location estimates. The TTB can, but need not, be modified by estimates of the uncertainty in tag location.

Integration of Results from Receiver-Located Tags and Self-Located Tags

In some applications of the invention, a receiver-located tag and a self-located tag could be attached to the same target. An example includes, but is not limited to, an endangered species having both VHF and GPS tracking tags attached to it.

An embodiment of the invention is to use the co-location of the receiver-located tag and the self-located tag to improve the precision and/or accuracy of algorithms used to locate tags. An example of the improvement process includes, but is not limited to estimate the target location based on the receiver-located tag and/or estimate the target location based on the self-located tag. Additionally, or alternatively, to determine if one of the location estimates is of higher accuracy and/or precision. An example of this determination includes, but is not limited to, an endangered species with both VHF and GPS tags attached to it. In this example, the location estimate from the GPS tag might be considered both more accurate and more precise than that from the VHF tag. Some methods may adjust the algorithm used to generate the less-precise and/or less-accurate position estimate based on the more accurate estimate. Adjustment methods can include, but are not limited to, minimization of mean square error, creation or modification of linear scale factors, creation or modification of non-linear correction equations, and machine-learning algorithms.

The above process can, but need not, be continuous such that it results in a consistent improvement in the precision or accuracy of position estimates. The process also can, but need not, be automated such that improvements are implemented without human intervention.

VHF System Design

The VHF System is designed to detect condors that carry VHF transmitter tags. These tags emit pulses of VHF radio signal at a specified frequency which is tied to a specific bird identifier. An antenna and receiver are used to scan for known frequencies, effectively listening for tagged condors that might enter the coverage area. The design assumes that the tags are model number RI-2C from Holohil, but the system can be adapted to use any tag that transmits within the same frequency range at a comparable pulse rate.

The VHF system includes of six or more detection stations. Each detection station includes a series of antennas, receivers, a station controller, a communications system, and a power supply that work together to detect VHF-tagged condors that enter the coverage area. The coverage area will depend on the final locations of the VHF detection stations, but the objective is to cover as much area as possible within 25.7 km (16 miles) of any wind turbine.

Each VHF detection station will create condor position estimates based on the strength of received signals. The UAMS will consolidate all signal strength and heading information from all VHF detection stations for processing. The following sections describe the design of the VHF system, beginning with two options for detection station locations. Each VHF detection station includes of the following components: Antennas, receivers, station controllers, a communication system, a power supply, or combination thereof.

Figure 8:
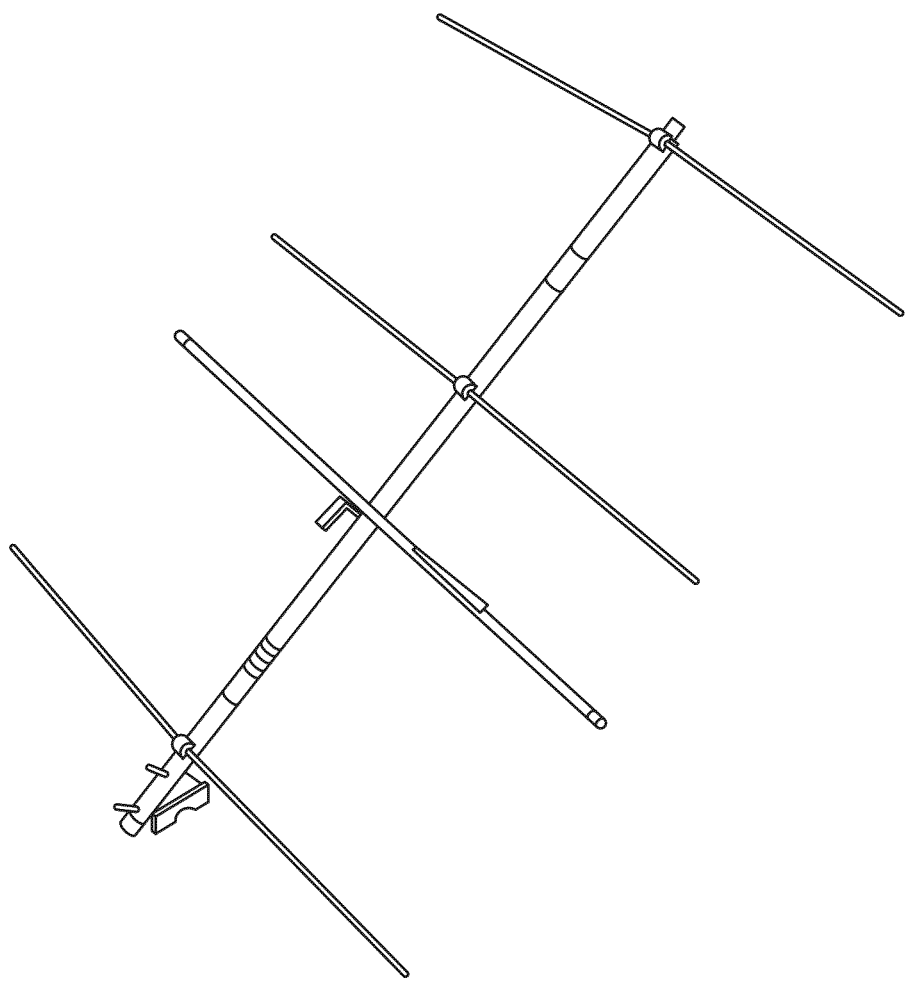
FIG. 8 is an Example Yagi Antenna from Advanced Telemetry Systems

The VHF signals emitted from the condor tags will be picked up by Yagi antennas (see FIG. 8). Yagi antennas focus their field of view, with a narrower field associated with increased gain (i.e. —detection power). Multiple antennas will be used at each detection station. One possible configuration is to use 4 antennas, each with a 90-degree field of view. This would allow the detection station to identify the rough heading towards a detected condor. Other configurations make use of additional antennas to provide more refined heading estimates.

A receiver is a device that processes signals picked up by the antennas to identify when a VHF tag is present. This is achieved by tuning the receiver to predetermined frequencies (i.e. —VHF tag frequencies provided by United States Fish and Wildlife Service) and listening for pulses emitted by VHF tags. The receiver listens for each frequency one at a time and sends a signal to the station controller whenever a tag is detected. Such receivers may include a Lotek SRX800 MD4 and the ATS R4500SD These receivers allow for remote reprogramming, so they are suited to use in the VHF system without modification. However, they are frequently designed for periodic data download rather than real-time monitoring. There are multiple possible solutions that range from modification of receiver firmware to custom programs running on the station controller.

The number of receivers required will depend on the number of VHF tags to be tracked, the number of birds that need to be tracked simultaneously, the pulse rate of the VHF tags, and the specific feature set of the receiver, including modifications.

The station controller is a computer that serves as the interface between the detection station and the central UAMS server. It is responsible for ingesting tag detection data from the receiver, calculating distance and heading estimates, and relaying position estimate information to the UAMS. It will also be the vehicle for updating tag frequencies. In one example, a candidate station controller is the Stealth WPC-725F Each VHF detection station needs to communicate with the central UAMS server. This communication will be achieved via cellular modems and antennas. The cellular modem will provide the station controller with access to the internet. This access will be used to create a virtual private network (VPN) tunnel to the UAMS. The VPN provides a secure, encrypted communications channel to allow the controller to transmit tag detection data, the UAMS to provide updated tag frequency lists, and staff access for system maintenance. In one example, a candidate cellular modem is the Pepwave MAX BR1. The cellular modem will require a pair of antennas. Directional or omnidirectional antennas may be used.

The detection stations will be remote with no access to utilities. Therefore, they will require power generation and storage capabilities to allow continuous operation. The power supply system must be weatherproof and robust enough to survive the high winds common in the area. The equipment will be attached to the detection station tower or to ground anchors. Preliminary estimates of the power budget indicate an average power draw of 40 W. In one example, a candidate power supply system is the Tycon Systems RemotePro.

The most significant cost driver for the detection station hardware is the scan frequency. Each detection station must be able to scan through all VHF tag frequencies within 2 minutes (Ventura Fish and Wildlife Office, 2013). The amount of time required for each scanned tag depends on the tag pulse rate. VHF tags do not transmit continuously. Instead, they sent short pulses at a predetermined rate. The standard pulse rate for the model of tag deployed on California condors is 40 pulses per minute (1.5 seconds per pulse).

Detection of multiple pulses is necessary to confirm that a received signal is indeed a VHF tag and not noise. The number of pulses defines how long it takes to check each frequency. This process is further complicated by the fact that receivers often include features that allow for different pulse count requirements under different conditions. For example, the scanning process for the ATS R4500SD is:
1. Listen on all antennas simultaneously for 2 pulse periods (3 seconds)
2. If less than two pulses are detected, change to the next frequency and go back to step 1
3. If two pulses are detected, listen on the first antenna
4. If less than two pulses are detected, switch to the next antenna and go back to step 3
5. If two pulses are detected, keep listening for 3 more pulses
6. If 3 more pulses are detected, record the presence of a tag, switch to the next antenna, and go back to step 3
7. If less than 3 more pulses are detected, switch to the next antenna and go back to step 3
8. Repeat steps 3-7 for all antennas As a practical example, consider an R4500SD connected to 4 antennas. Assuming a pulse period of 1.5 seconds, the receiver could scan for 40 tags in 2 minutes. However, if a tag is detected, that single frequency scan would take 24 seconds if 2 of the antennas received the signal: Listen on all antennas for 3 seconds (2 pulses detected); Listen on antenna 1 for 3 seconds (no pulses detected); Listen on antenna 2 for 7.5 seconds (listen for 5 pulses); Listen on antenna 3 for 7.5 seconds (listen for 5 pulses); Listen on antenna 4 for 3 seconds (no pulses detected).

That reduces the number of other frequencies checked within 2 minutes from 40 to 32. If a second tag is detected, the number of other frequencies checked drops to 24. More tag detections result in further reduction in the number of other frequencies checked. The receiver can track 5 simultaneous tags before the 2-minute limit is exceeded.

Condors tend to congregate in groups. Group size may be as small as 4-5 individuals at a roost and as large as 25 (or more) individuals feeding at a large carcass. Assuming the station controller manages each receiver's frequency list so no receiver is overloaded, use of 4 receivers would allow tracking of 5 simultaneously present tags and 120 other frequencies. Use of 8 receivers would allow tracking of 25 simultaneously present tags and 120 other frequencies.

There are some options to reduce the number of receivers that are necessary. One option is to reduce the number of pulses required to confirm detection. This could cause the cost of the detection stations to go down. If discussions with United States Fish and Wildlife Service (USFWS) reveal that more than 25 simultaneous tags must be tracked, then the cost of detection stations will go up.

Tower Locations

The number and locations of the VHF detection stations define the VHF system coverage area. Each detection station covers an area roughly defined by line-of-sight. The lines of sight are limited by topography. The variability in elevation around the wind farms of interest is great enough that complete coverage is not practical—there are simply too many areas that are shadowed by mountains, hills, cliffs, canyons, and valleys. Tower locations were selected to provide adequate coverage to avoid allowing tagged condors to approach within 3.2 km (2 miles) undetected.

Figure 2:
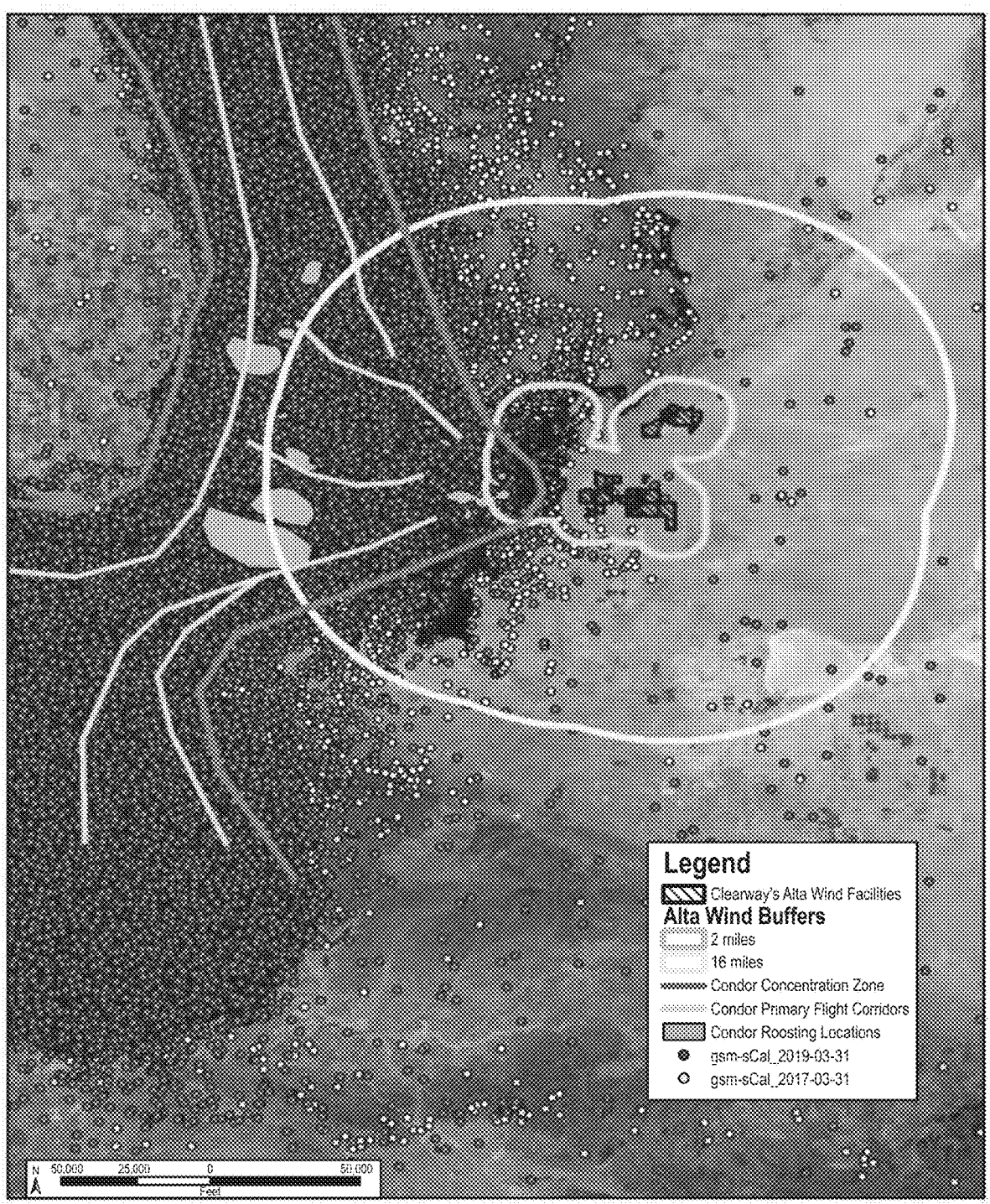
FIG. 2 is a Condor Activity Summary

Locations were selected based on the following factors:
1. Coverage area based on direct line-of-sight
    a. The coverage area was evaluated assuming a condor at three different elevations: 0 m, 10 m, and 100 m above ground level
2. Historical condor behavior, including flight paths and roost areas
3. Area covered by more than one station
    a. Coverage by multiple detection stations allows for more accurate positioning of a condor
4. Number of detection stations required
    a. Using a minimum number of detection stations will minimize system cost GIS data, including a digital elevation model and location data from GPS-tagged condors, was used to identify candidate VHF detection station locations. FIG. 2 shows the condor activity used to guide the analysis.

The purple and yellow dots represent condor position fixes. The position data was used to identify primary condor flight paths and roost locations. Most activity is located within the red lines drawn on the figure. The blue lines represent common flight paths. Orange-shaded areas represent likely roost locations.

Figure 3:
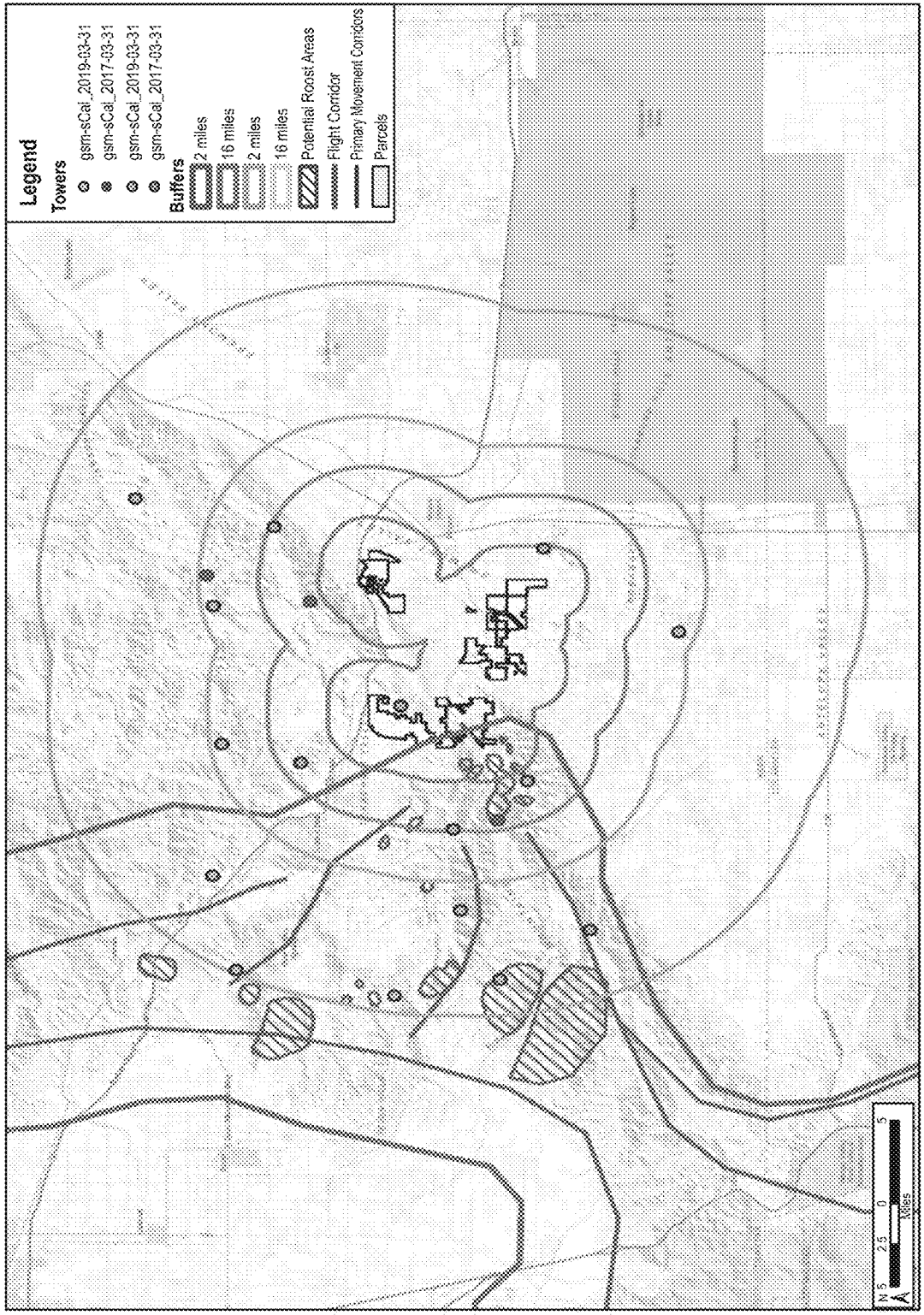
FIG. 3 is a Tower Location Options Considered
Figure 4:
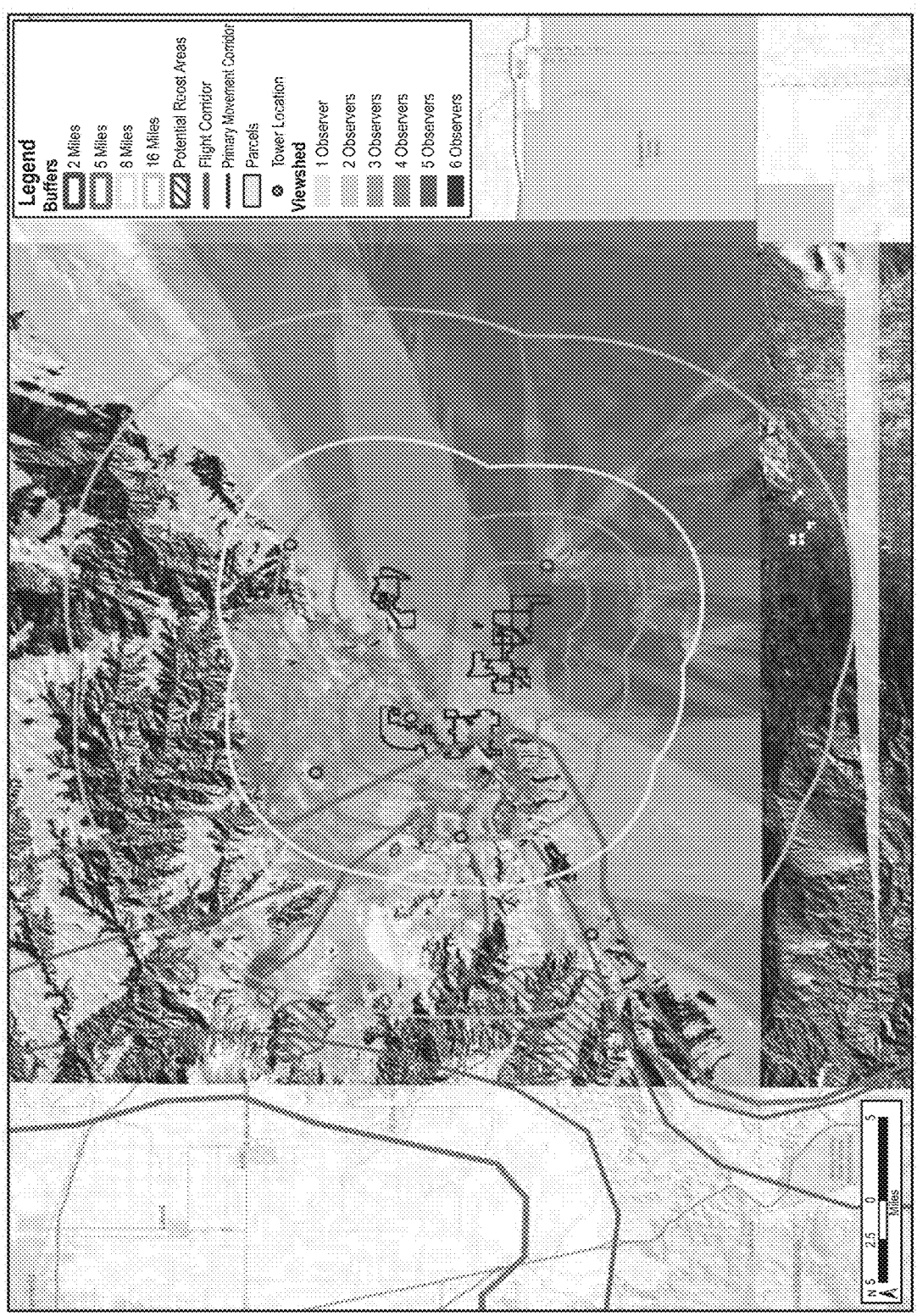
FIG. 4 is a Six Tower Line of Sight to 100 m Elevation
Figure 5:
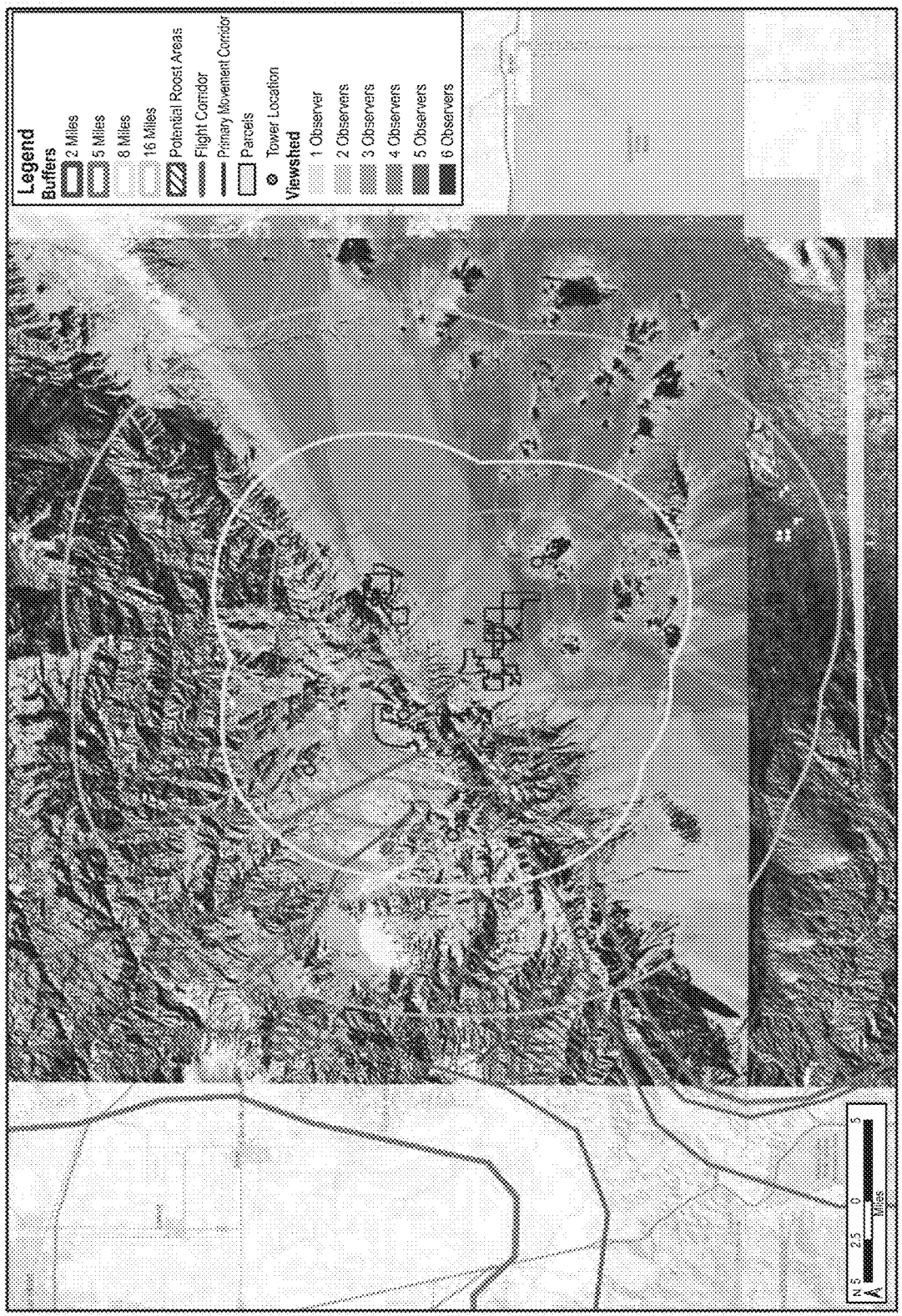
FIG. 5 is a Six Tower Line of Sight to Ground Level

The candidate detection station locations where evaluated in a variety of combinations to determine which offered the appropriate mix of total coverage area and high-quality coverage in high-traffic areas. FIG. 3 shows the tower locations considered. Two options best met the criteria. The first includes 6 towers. FIG. 4 shows the coverage area for the 6-tower system assuming a condor is 100 m above ground level. FIG. 5 shows the coverage area assuming a condor is on the ground.

The increased coverage area in FIG. 4 compared to FIG. 5 is based on the difference in assumed condor elevation. The variation in ground elevation makes it difficult to get high coverage at ground level. However, condors do not travel while on the ground, so full coverage is not necessary. The assumption of 100 m elevation is a better representation of a condor in transit.

Colors on the map represent the number of detection station that can view the area. Pale yellow areas are visible to only one detection station. The VHF system will have the least positional accuracy for condors in these areas. Progressively darker colors indicate the number of detection stations that can view the area. A condor detected by multiple stations can be positioned more accurately than one detected by fewer stations.

Figure 6:
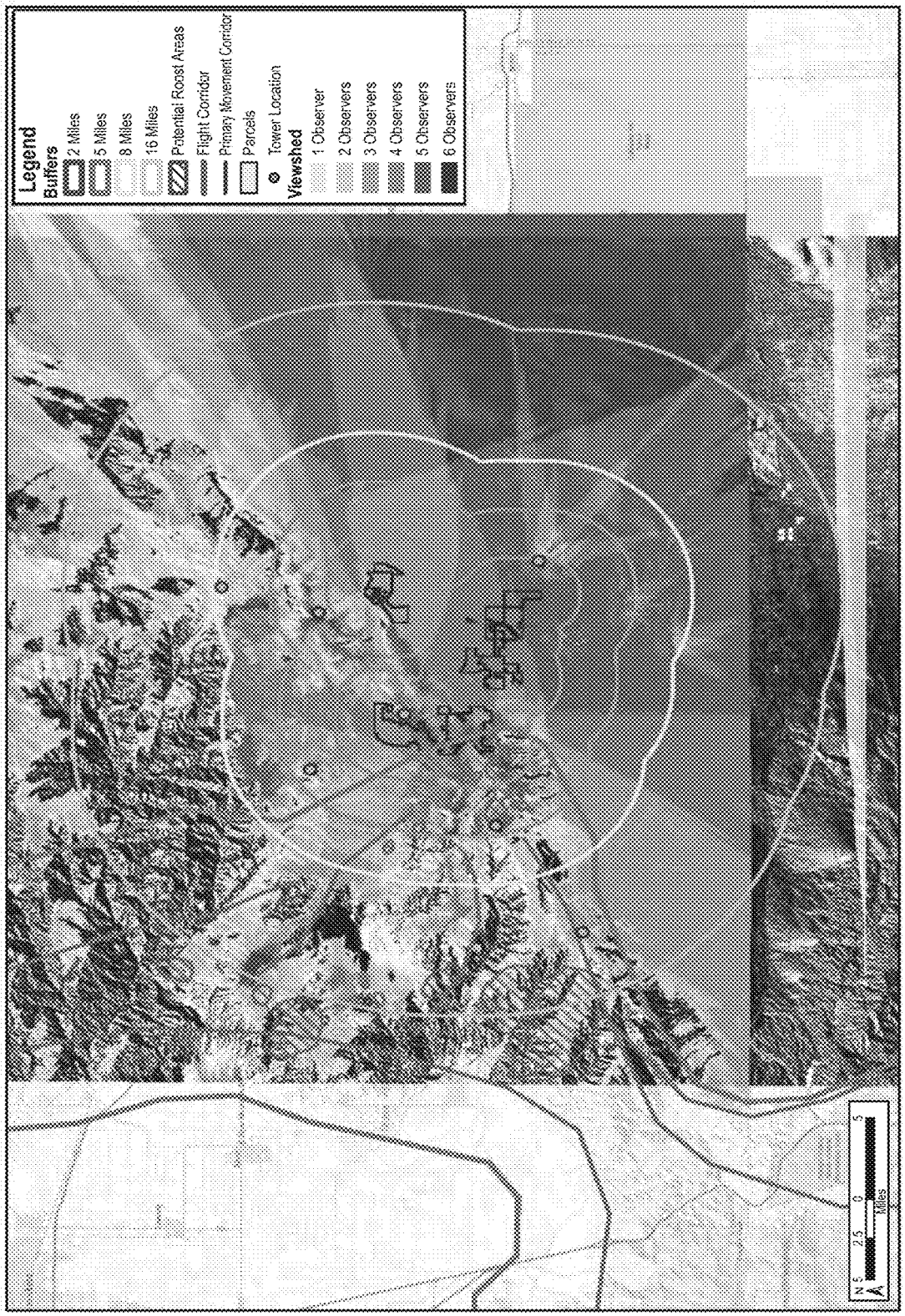
FIG. 6 is a Seven Tower Line of Sight to 100 m Elevation
Figure 7:
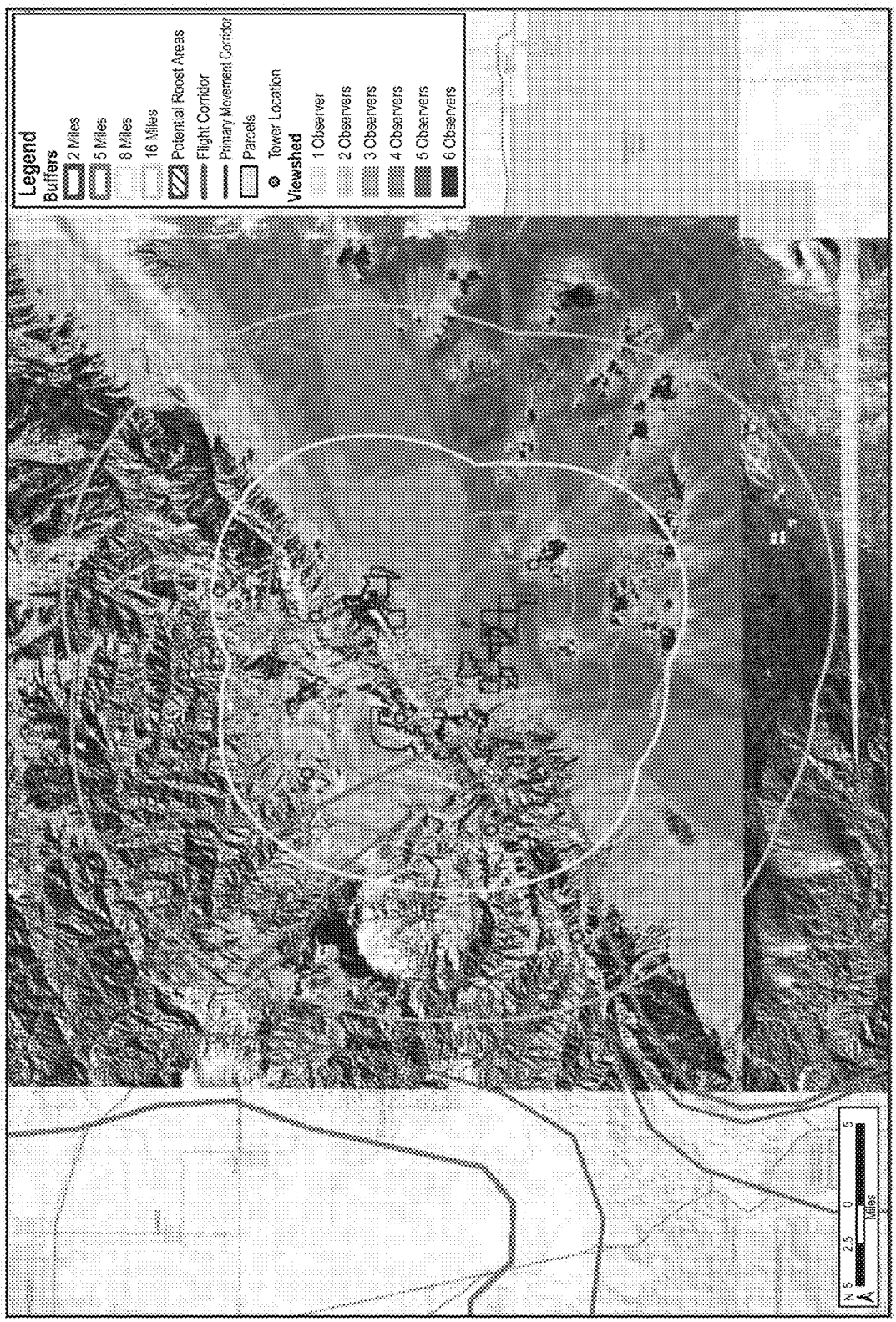
FIG. 7 is a Seven Tower Line of Sight to Ground Level

The second option uses seven towers to provide better coverage to the north of the site while also shifting coverage on the west towards the roost areas near Alta 1. FIG. 6 shows the coverage area of the 7-tower system assuming a condor is 100 m above ground level. FIG. 7 shows the coverage area assuming a condor is on the ground The seven-tower configuration has better coverage to the north of the site, but slightly worse coverage to the far west (compare FIG. 4 and FIG. 6). The far western coverage was traded to get better ground-level coverage at the roost areas to the southwest of Alta 1.

The viewshed analysis used to generate the coverage areas neglects some of the more subtle effects of topography on VHF signal propagation and the effect of distance (condors near detection stations will likely produce signals even without line-of-sight). These effects can be included in the GIS analysis, which will allow for better tower site selection, including micro-siting based on ease of access.

Blind Spot Mapping

The coverage maps in FIG. 4 through FIG. 7 include areas where there is no coverage. This is due to the rough terrain; hills and canyons create areas where none of the VHF detection stations are within line-of-sight. More sophisticated signal degradation modeling will be included in the full system design. The modeling will combine Fresnel zone, signal reflection analysis via ray tracing, and cluttered environment signal propagation methods to create a more accurate coverage map. The more accurate map will be used to identify areas where coverage is expected to be non-existent and to confirm that those blind spots do not permit a condor to approach the project boundary undetected. Critical potential blind spots will be checked after the installation of the VHF detection stations as described herein.

Heading Estimates

The VHF system will make use of multiple directional antennas instead of a single omnidirectional antenna. An omnidirectional antenna receives signals from all directions. A side effect is that it cannot determine from which direction the signal is coming. A directional antenna receives signals from a range defined by an angle. For example, a directional antenna with a 90-degree field of view could receive signals from headings of 0-90 degrees (north to east), but not from any other headings. Arranging multiple antennas that point in different directions will identify the approximate heading of a detected condor relative to the detection station. For example, 4 antennas that have 90-degree fields of view can indicate the cardinal direction to the condor (north, south, east, or west).

Figure 9:
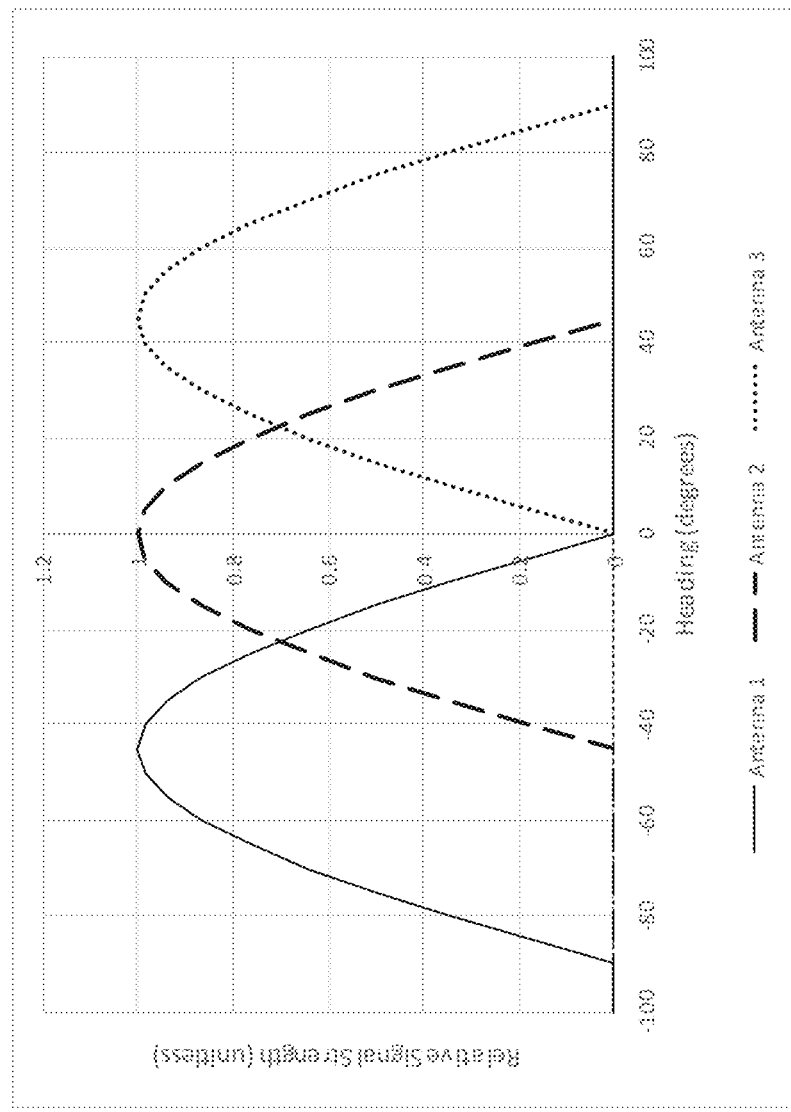
FIG. 9 is a Simplified Heading Refinement Example

Additional antennas can further refine the heading estimate by comparing relative signal strengths. This is possible because directional antennas do not have uniform gain. Signals directly in front of the antenna will result in a higher measured signal strength than signals that are offset, even if the offset signal remains in the field of view. For example, two antennas with 90-degree fields of view that are offset by 45 degrees will have overlapping detection areas. The relative strength of the received signal can be used to refine the heading estimate. A simplified example is shown in FIG. 9.

The figure shows the simplified representation of signal gain for three antennas mounted at the same location. Each antenna has a nominal 90-degree field of view, and they are offset from one another by 45 degrees. A VHF signal originating from a heading of 0 degrees would result in a strong signal at antenna 2 (relative signal strength of 1) and low signals from the other two antennas (relative signal strength of 0). A VHF signal originating from a heading of 10 degrees would result in a strong signal at antenna 2 (relative signal strength of 0.94) and a moderate signal on antenna 3 (relative signal strength of 0.34). The ratio between these two signals (2.8:1) can be used to determine the heading.

Distance Estimates

It is possible to estimate the distance from a VHF tag to a detection station based on the strength of the received signal. VHF signals degrade (i.e. —lose strength), as they travel away from the transmitter. Knowledge of the transmitter power, antenna gain, and the equations governing signal degradation can be combined to create a relationship between the signal strength measured by an antenna and the distance to the transmitter. However, the real-world relationship between signal strength and distance is complex. Some of the complicating factors include changing atmospheric conditions can change the rate at which VHF signals decay. If the condor is travelling, the topography between the tag and the detection station is continually changing, which will change the rate at which the VHF signal decays. Other factors include that VHF signals can bounce off topographical features (multipath propagation) and that changing attitude of the condor can change the signal strength that reaches the detection station.

Despite the complexity, the benefits of distance estimation make it worthwhile to calculate. With good distance estimates, even a single detection station can allow for rough positioning of a tagged condor. Improved condor position estimates will improve CIRT efficiency by directing ground crews more accurately. It will also allow for more accurate calculation of the TTB. Strategies have been developed for mitigating the problems inherent in using signal strength to estimate distance.

Monitoring of Sentinel Signals to Track Environmental Conditions

The VHF system design includes sentinel signals. These are VHF tracker tags placed such that each detection station will pick up at least one. The primary purpose of the sentinel signals is to identify detection station failure—if the sentinel signal is lost, then it is possible that the detection station has gone offline.

The sentinel signals will also be used to track the effect of atmospheric conditions on signal strength measurements. Since the sentinel signals are stationary, the distance between each one and the VHF detection stations is known.

Any change in signal strength will be due to atmospheric conditions alone. The VHF system will use deviation from nominal signal strength to calculate a correction factor for all VHF tag distance estimates.

Mapping of Topographic Effects

VHF signal propagation is not based strictly on classic line-of-sight; it is possible for a VHF tag and a VHF detection station to "see" one another but still have significant signal degradation. This is due to the fact that a VHF signal has a zone in which intervening topography can "block" the signal, called the first Fresnel Zone (e.g., as shown in FIG. 1). Contrast this concept with traditional line-of-sight, where blockage is defined relative to a straight line rather than a zone.

As shown in FIG. 1, the blue structures represent a transmitter and antenna. The green shaded area represents topographic features between the transmitter and antenna. The distance D represents the distance between the transmitter and antenna. The black ellipse represents the Fresnel Zone. The distance r represents the maximum radius of the Fresnel zone.

Any object within the Fresnel zone will degrade the strength of the signal received by the antenna. In general, the Fresnel zone should have less than 20% blockage for effective transmission. More than 40% blockage is likely to cause significant signal degradation. The maximum radius of the first Fresnel zone for a transmitter and antenna separated by 25 km (15.5 miles) is 107 m (351 ft). This means that any topography within 107 m (351 ft) of the line between a condor and a detection station will degrade the received signal strength.

Signal blockage by topography complicates condor positioning because it means that signal strength is not just a function of distance, but also position. A condor that is nearby, but has lots of topography between it and the detection station, may have a weaker reported signal strength than a condor that is distant but has a clear Fresnel zone. This problem will be mitigated by mapping areas of free propagation.

An area of free propagation has 20% or less obstruction within the first Fresnel zone. Since the topography between the VHF detection stations and any given point remains static, it is possible to calculate those areas that meet that criteria. Within those areas, signal strength will degrade as a simple function of distance, so the distance can be estimated.

The efficacy of the above approach will depend on the system's ability to determine whether a signal is coming from an area of free propagation. It will be possible to make this determination based on signal strength and consistency. Signals received from tags located where there is an obstructed path to the VHF detection station will likely be characterized by reduced signal strength and high variability.

System Mapping

The propagation characteristics of VHF signals is heavily location dependent. Topography, vegetation, other VHF signal emissions, environmental conditions, man-made structures, and condor movements will all affect the strength of VHF signals that reach the detection stations. These factors can also confound position estimates due to bouncing of VHF signals. Further mitigation is planned after the detection station installation via mapping of the coverage area.

A VHF tag will be moved around the coverage area either via helicopter or drone. The VHF system will track the movement of the tag, while the tag's position will also be monitored via GPS. The GPS-based position will be overlaid with the VHF tracking system data and processed to achieve one or more the following objectives: confirm sufficient coverage to detect condors in time to implement curtailment decisions; quantify the accuracy of the heading estimation method; quantify the accuracy of the free-space distance estimates; quantify the overall uncertainty in VHF-based position estimates; check for coverage in blind spots; check for ghosting (mistaken tag position estimates based on strong signal bounce), with a focus in the identified blind spots; develop empirical correction factors to improve VHF-based position estimates.

Overall, the system mapping will validate that the system is capable of notifying the CIRT in time to respond to the presence of a condor and to implement curtailment if necessary. It will also help to refine position estimates.

GPS System Design

The GPS system is designed to detect condors carrying GPS tags. These tags report GPS position data to their manufacturer via Global System for Mobile Communications (GSM network) (i.e. —a cellular data connection). This design assumes that all tags are manufactured by Cellular Tracking Technologies (CTT). Normally, the tags record their position continually but only transmit the positions once per day. This conserves battery power. The tags also have the ability to store geo-fences. A geo-fence is a virtual geo-referenced line (or connected series of line segments) that trigger a change in tag behavior. For this application, whenever a tag crosses a geo-fence, it immediately reports its position instead of waiting for the next scheduled update. A series of nested geo-fences that each represent a closed shape will allow for tracking a condor as it enters, moves through, and leaves the coverage area.

GPS tags also allow for changes to their update rate when geo-fences are crossed. For example, a tag could be triggered to send an update every 5 minutes while inside a particular geo-fence instead of once per day. This will allow for tracking of a condor that crosses one geo-fence but not the next nested one, remaining between the two for an extended period of time. Changes to update frequency can be detrimental to tag battery life. The GPS system will ingest the GPS tag positional information and feed it into the UAMS for processing.

Interface with CTT

GPS tags are programmed to report to the CTT central server. Therefore, the GPS system will need to interface with the CTT server rather than obtaining data directly from the tags. CTT already offers built-in alerting features that can be adapted to allow this interface, such as automated emails. The GPS system can be configured to receive and parse emails from CTT to feed condor position data into the UAMS. Alternatively, it may be possible to develop GPS system features that interface directly with the CTT server to obtain alerts.

Interface with USFWS

The GPS system will not function as designed without the ability to get custom geo-fence installed and receive alerts based on tags crossing those fences.

Unified Monitoring and Alerting System (UAMS) Design

The UAMS consolidates all VHF and GPS data for consumption by the CIRT. It will issue alerts to CIRT staff, provide condor position and trajectory information, and plot those data on a map. The intent is to mobilize ground crews efficiently as well as to provide all data necessary for the on-site biologist to make turbine curtailment decisions via a predetermined but configurable set of response protocols.

Integration of VHF and GPS Data

The VHF and GPS systems do not themselves trigger CIRT responses. The UAMS consolidates the information from both subsystems to create a clearer picture of condor locations and trigger response protocols. Some of the functions enabled by this data integration are:

Identifying when two signals (one VHF and one GPS) refer to the same bird.

Correlating VHF and GPS position estimates to identify possible errors.

Storing correlated VHF and GPS position estimates for future improvements in VHF positioning accuracy.

Using data from multiple VHF towers to refine condor position estimates.

Providing an integrated map view showing both VHF and GPS signal detections for use by CIRT staff Location by Exclusion The blind spot mapping and system mapping, described herein, allow the UAMS to take advantage of multiple VHF detection stations even if only a single station is able to detect a condor. The UAMS will eliminate possible condor positions by excluding areas that would be detected by other towers.

CIRT Interfaces

The UAMS is the primary interface with the condor monitoring system for CIRT staff and others. A variety of interfaces will be available. The following list is a list of example interfaces; additional options are possible.

Text and email alerts—these messages will be sent out whenever a condor is detected by the UAMS. Follow-up messages will be sent as long as the condor remains in the coverage area. The specific audience for each alert can be tailored based on condor behavior. For example, alerts for distant condors might be limited to the on-site biologist, while detections near the project boundary might immediately go out to all CIRT staff. Alert content will also be variable. For example, a text-only alert is appropriate for ground crews that may be in remote locations with poor cellular reception. Alerts that include a static map can provide more information to crews that have sufficient (but perhaps intermittent) connectivity. Alerts with links to the live map (see below) are appropriate for individuals with access to a fast and reliable internet connection.

Live site map—this map will show the project boundary, turbine locations, detection station locations, detection station health, and the position of detected condors (including the positional uncertainty).

Response protocol dashboard—this interface will show the current state of UAMS responses based on the position and positional uncertainty of detected condors. It will include features such as a list of alerts issued, a list of alert recipients, a list of alert recipient responses, and conditions for elevation to the next level of response. It will also include controls to allow the on-site biologist to override any automated responses, both for the purposes of deescalating unnecessary responses and initiating new responses.

System health dashboard—this interface will provide details on system health monitors, such as sentinel signal measurements, station controller connectivity, and detection station cellular signal strength measurements. Elements of this interface may be hosted in the cloud to allow engineers real-time access to system health data.

System administration dashboard—this interface will provide administrative access to the condor monitoring system. It will allow for updating of VHF tag frequency lists, administration of station controllers, station controller software updates, and access to in-depth system health information for debugging. This interface may feature adjustable permissions, such as assigning some users read-only access.

UAMS server—access to the UAMS server will allow for periodic administrative maintenance and software updates.

Interfaces are tailored to the various audiences. For example, an interface for an on-site biologist may emphasize text and email alerts, live site map, response protocol dashboard, and/or a system health dashboard. In another example, a ground crew interface may include text and email alerts and a live site map. A System Control and Data Acquisition (SCADA) operator's interface may include text and email alerts and a live site map. An environmental lead interface may include text and email alerts, a live site map, response protocol dashboard, a system health dashboard, and/or a system administration dashboard. A systems administrator interface may further include a UAMS server.

Time to Boundary Algorithm

The UAMS will include a variety of response protocols based on condor location and trajectory. These protocols will be triggered based on a unified measurement of condor risk called the Time to Boundary (TTB). The TTB is an estimation of the amount of time it would take a condor to get within 3.2 km (2 miles) of the project boundary. The calculation of this time will vary depending on condor behavior and the level of trajectory detail provided to the UAMS. If the condor is stationary (and the UAMS is able to determine that fact) then the travel time will be high. If the condor is travelling tangentially to the project boundary, the travel time may also be high. If the condor is traveling directly towards the project boundary, the travel time will be low.

As a condor approaches the wind farm, the TTB decreases. Response protocols will be tied to configurable TTB values to offer a spectrum of options that are tailored to varying levels of risk. The TTB calculation will be based on integrated data from both the VHF and GPS systems, and it will account for uncertainty in condor position and trajectory.

Curtailment strategies based on the TTB can be used. An example would be the minimum TTB before a curtailment command must be issued. The algorithm to compute that value would be to add up the following times:

Time needed for turbines to slow to a safe speed

Time between the on-site biologist's decision to curtail and the command being issued to the turbine SCADA system Time for a condor to travel from a point located 3.2 km (2 miles) from the project boundary to a wind turbine.

Any time the TTB reaches the minimum value, the UAMS would trigger its most severe response protocol, which might include actions as aggressive as issuing an automatic curtailment recommendation to the SCADA operator.

A critical feature of the TTB calculation is that is a conservative estimate. As a result, a condor detected by the VHF system with a very high positional uncertainty could result in a low TTB. It is expected that the on-site biologist and ground crews will use visual confirmation of condor location instead of the TTB whenever it is available. The response protocol dashboard will include features that allow the on-site biologist to override any UAMS response protocols.

TTB Based on VHF Positioning

Calculation of the TTB based on the VHF system will be subject to varying positional uncertainty. If the condor is in an area with good VHF coverage from multiple towers, then the positional accuracy may be high. If the condor is only detected by a single tower, then the positional accuracy may be low. The multi-antenna design of the detection stations is intended to mitigate this uncertainty. For example, for a condor detected to the north of a detection station that is on the north side of the site, the UAMS will know that the condor is no closer than the tower itself. For a condor on the south side of that same tower, the UAMS would know that the bird is between the tower and the wind farm (likely triggering more severe protocols).

In general, the UAMS will use data from all VHF detection stations to determine the area in which the condor could be located. It will compute the TTB based on the point in that area that is closest to a wind turbine. The TTB will be modified by condor trajectory data, if available. A VHF-tagged condor moving through the coverage area will be detected by a sequence of detection station antennas. The specific sequence can be used to compute a flight path.

A summary of the TTB calculation algorithm for VHF-tagged condors is:
1. Assemble the signal strength and heading estimate data from all towers that are currently receiving a VHF signal.
2. Use the assembled data to calculate an area in which the condor could be located.
    a. If multiple towers are detecting the signal, the position will be estimated using triangulation.
    b. If a single tower is detecting the signal, then the position will be based on the heading estimate, distance estimate, and exclusion of areas visible to multiple towers.
3. If available, estimate the condor's flight path based on all previous position estimates since initial contact.
4. Investigate the flight path to determine whether the initial position estimate can be refined based on previous positions.
5. Assume the condor is at a position nearest a wind turbine based on the above refinements.
6. Select the possible condor trajectory that would bring it into contact with a wind turbine in the shortest time.
    a. If no trajectory can be calculated, assume the condor is moving directly towards the nearest wind turbine at maximum speed.
7. Calculate the TTB based on the selected trajectory and position.

The above algorithm will be repeated continuously until the condor leaves the coverage area.

TTB Based on GPS Positioning

Condors with GPS tags allow for the most accurate TTB calculation. However, the accuracy will be time dependent. Based on the need to conserve tag battery power, it has been assumed that the GPS tags will send periodic updates rather than continuous updates. Depending on the feature set of the GPS tags available to the condor monitoring system, the updates may come at some configurable frequency or only when the tag crosses a geo-fence. Either way, the uncertainty of each reported position begins to grow as soon as it is provided.

The rate of growth will depend on the specific data provided by the tag. If accurate trajectory information is available, then the uncertainty will grow fastest in the direction of travel. If no trajectory information is available, then the uncertainty will grow uniformly in all directions. Assuming that the GPS tag will report a position whenever a geo-fence is crossed, geo-fences adjacent to the condor's last reported position bound the maximum possible uncertainty.

Trajectory uncertainty will also begin to grow immediately upon receipt of data. The condor may change speed and direction over time. In the absence of updated trajectory information, the rate of growth in position uncertainty will trend towards a uniform increase in all directions.

A summary of the algorithm to calculate TTB based on GPS data is:
1. Determine the condor's last reported GPS position.
2. Determine the condor's estimated trajectory.
    a. The trajectory could be provided directly by the GPS tag, or it could be calculated based on position history.
3. Calculate the uncertainty in condor position and trajectory based on the length of time since the last reported values.
4. Assume the condor is at a position nearest a wind turbine given the uncertainty calculation.
5. Select the possible condor trajectory that would bring it into contact with a wind turbine in the shortest time.
6. Calculate the TTB based on the selected trajectory and position.

Ongoing System Training

Some condors have both GPS and VHF tags. The UAMS will take advantage of this fact to continually refine the VHF coverage map. The UAMS will store the GPS position history and VHF signal strength measurement history of each dual-tagged bird that enters the coverage area. These data may be supplemented by more detailed data from the daily position uploads if it is available. The GPS data will be correlated with the VHF sentinel signal strengths measured at individual VHF detection stations to derive an empirical relationship between VHF system data and condor position. The correlations will be reviewed to confirm they are accurate. An automated correlation algorithm that continuously improves VHF positional accuracy can be used. This approach will naturally provide the greatest improvement in the areas of greatest condor activity.

The above specification provides a complete description of the structure and use of illustrative configurations. Although certain configurations have been described above with a certain degree of particularity, or with reference to one or more individual configurations, those skilled in the art could make numerous alterations to the disclosed configurations without departing from the scope of this invention. As such, the various illustrative configurations of the methods and systems are not intended to be limited to the particular forms disclosed. Rather, they include all modifications and alternatives falling within the scope of the claims, and configurations other than the one shown may include some or all of the features of the depicted configurations. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one configuration or may relate to several configurations. Accordingly, no single implementation described herein should be construed as limiting and implementations of the disclosure may be suitably combined without departing from the teachings of the disclosure.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims. The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method of monitoring one or more birds that each has a receiver-located tag and/or a global positioning satellite (GPS) tag, the method comprising:
   for each of the bird(s) having a receiver-located tag:
      receiving, at at least one of a plurality of detection stations, a signal from the receiver-located tag, each of the detection stations comprising two or more directional antennas;
      determining bird heading information and bird distance information, wherein:
         the bird heading information includes, for each of the detection station(s) that receives the signal, a heading of the bird relative to the detection station, the heading determined based at least in part on a strength of the signal measured at each of the directional antennas of the detection station; and
         the bird distance information includes, for each of the detection station(s) that receives the signal, a distance between the bird and the detection station, the distance based at least in part on a strength of the signal measured at at least one of the directional antennas of the detection station; and
      estimating a position and trajectory of the bird, the position of the bird estimated based at least in part on the bird heading information and/or the bird distance information; and
      calculating an amount of time for the bird to reach a boundary around a wind turbine (TTB) based at least in part on the estimated position and trajectory of the bird; and
   for each of the bird(s) having a GPS tag:
      receiving GPS data from the GPS tag when the bird crosses a geo-fence that surrounds the wind turbine;
      estimating a position and trajectory of the bird, the position of the bird estimated based at least in part on the GPS data and a time elapsed between when the bird crossed the geo-fence and when the position of the bird is estimated; and
      calculating the TTB based at least in part on the estimated position and trajectory of the bird;
   wherein:
      at least one of the bird(s) has a receiver-located tag and a GPS tag; and/or
      the one or more birds comprise two or more birds, at least one of the birds having a receiver-located tag and at least one of the birds having a GPS tag.

2. The method of claim 1, wherein for each of the detection stations:
   each of the directional antennas has a field of view that is less than or substantially equal to 90 degrees; and
   the directional antennas are positioned on the detection station such that an overlap between the field of view of each of the directional antennas and the field of view of at least one other of the directional antennas is less than or substantially equal to 45 degrees.

3. The method of claim 2, wherein determining the bird heading information includes, for each of the detection station(s) that receives the signal, calculating a ratio between the strength of the signal measured at a first one of the directional antennas and the strength of the signal measured at a second one of the directional antennas.

4. The method of claim 3, comprising:
   for each of the detection stations:
      receiving a sentinel signal at the detection station from a receiver-located tag of at least one of one or more stationary sentinel stations;
      calculating a correction factor based at least in part on the sentinel signal(s);
   wherein for each of the bird(s) having a receiver-located tag, the distance between the bird and each of the detection station(s) that receives the signal from the receiver-located tag is determined based at least in part on the correction factor.

5. The method of claim 4, comprising for each of the bird(s) having a receiver-located tag, for each of the detection station(s) that receives a signal from the receiver-located tag of the bird:
   determining an extent to which a Fresnel zone between the receiver-located tag and the detection station is obstructed;
   wherein the distance between the bird and the detection station is determined based at least in part on the extent to which the Fresnel zone is obstructed.

6. The method of claim 5, wherein for each of the bird(s) having a receiver-located tag:
   a single one of the detection stations receives the signal from the receiver-located tag; and
   estimating the position of the bird is based at least in part on which of the detection stations did not receive a signal from the receiver-located tag.

7. The method of claim 6, wherein for each of the bird(s) having a receiver-located tag, estimating the trajectory of the bird is based at least in part on the position of the bird and one or more prior positions of the bird.

8. The method of claim 6, wherein for each of the bird(s) having a receiver-located tag, estimating the trajectory of the bird comprises estimating the trajectory as a linear path between the bird and the wind turbine.

9. The method of claim 8, wherein for each of the bird(s) having a receiver-located tag and each of the bird(s) having a GPS tag:
   estimating the position of the bird comprises determining a plurality of potential positions of the bird and estimating the position of the bird as the closest one of the potential positions to the wind turbine.

10. The method of claim 9, wherein a distance between the boundary and the wind turbine is substantially equal to 3.2 kilometers.

11. The method of claim 1, wherein each of the bird(s) is a condor.

12. The method of claim 1, wherein the receiver-located tag is a VHF radio transmitter.

13. The method of claim 12, wherein the two or more detection stations comprise six or more detection stations.

14. The method of claim 13, wherein:
   at least one of the bird(s) has a receiver-located tag and a GPS tag, the method comprising determining a correlation between a strength of one or more signals received from the receiver-located tag and one or more positions of the bird determined from the GPS tag; and for each of the bird(s) having a receiver-located tag, estimating a position of the bird is based at least in part on the correlation.

\* \* \* \* \*

UNITED STATES PATENT AND TRADEMARK OFFICE
CERTIFICATE OF CORRECTION

PATENT NO. : 11,950,567 B2
APPLICATION NO. : 17/687245
DATED : April 9, 2024
INVENTOR(S) : Steven Rizea and Emanoel Rizea It is certified that error appears in the above-identified patent and that said Letters Patent is hereby corrected as shown below:

On the Title Page

Item (71), please replace "Environment" with --Environmental--.

Signed and Sealed this
Eleventh Day of June, 2024

Katherine Kelly Vidal
*Director of the United States Patent and Trademark Office*